(12) United States Patent
Tsunogae et al.

(10) Patent No.: US 10,400,060 B2
(45) Date of Patent: Sep. 3, 2019

(54) CYCLOPENTENE RING-OPENING POLYMER AND METHOD OF PRODUCTION OF SAME, POLYMER COMPOSITION, AND CROSS-LINKED POLYMER

(71) Applicant: ZEON CORPORATION, Tokyo (JP)

(72) Inventors: Yasuo Tsunogae, Tokyo (JP); Fumiaki Bando, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 272 days.

(21) Appl. No.: 15/320,125

(22) PCT Filed: Jun. 18, 2015

(86) PCT No.: PCT/JP2015/067626
§ 371 (c)(1),
(2) Date: Dec. 19, 2016

(87) PCT Pub. No.: WO2015/194637
PCT Pub. Date: Dec. 23, 2015

(65) Prior Publication Data
US 2017/0129990 A1    May 11, 2017

(30) Foreign Application Priority Data

Jun. 19, 2014 (JP) ................................ 2014-126214

(51) Int. Cl.
| | |
|---|---|
| *C08G 61/08* | (2006.01) |
| *C08K 9/06* | (2006.01) |
| *C08L 65/00* | (2006.01) |
| *C08K 3/00* | (2018.01) |
| *C08K 5/00* | (2006.01) |
| *C08L 45/00* | (2006.01) |
| *C08K 3/04* | (2006.01) |
| *C08K 3/36* | (2006.01) |

(52) U.S. Cl.
CPC ............... *C08G 61/08* (2013.01); *C08K 3/00* (2013.01); *C08K 3/04* (2013.01); *C08K 3/36* (2013.01); *C08K 5/00* (2013.01); *C08K 9/06* (2013.01); *C08L 45/00* (2013.01); *C08L 65/00* (2013.01); *C08G 2261/11* (2013.01); *C08G 2261/135* (2013.01); *C08G 2261/1644* (2013.01); *C08G 2261/3321* (2013.01); *C08G 2261/418* (2013.01); *C08G 2261/592* (2013.01); *C08G 2261/70* (2013.01); *C08G 2261/72* (2013.01); *C08G 2261/76* (2013.01)

(58) Field of Classification Search
CPC ... C08K 3/00; C08K 5/00; C08K 3/04; C08K 3/36; C08K 9/06; C08L 45/00; C08L 65/00; C08G 61/08; C08G 2261/76; C08G 2261/70; C08G 2261/592; C08G 2261/418; C08G 2261/3321; C08G 2261/11; C08G 2261/135; C08G 2261/1644; C08G 2261/72
USPC ........................................................ 524/553
See application file for complete search history.

(56) References Cited

U.S. PATENT DOCUMENTS

| | | | |
|---|---|---|---|
| 4,137,390 A | 1/1979 | Ofstead | |
| 4,172,932 A | 10/1979 | Ofstead et al. | |
| 6,436,476 B1 | 8/2002 | Sage, Jr. | |
| 2012/0296035 A1* | 11/2012 | Tsunogae | B60C 1/00 524/576 |

FOREIGN PATENT DOCUMENTS

| | | |
|---|---|---|
| JP | 54-050598 A | 4/1979 |
| JP | 2010-037362 A | 2/2010 |
| WO | 01/60903 A1 | 8/2001 |

OTHER PUBLICATIONS

Jan. 31, 2018 Extended Search Report issued in European Patent Application No. 15809248.6.
Sep. 8, 2015 Search Report issued in International Patent Application No. PCT/JP2015/067626.

* cited by examiner

*Primary Examiner* — Angela C Scott
(74) *Attorney, Agent, or Firm* — Oliff PLC

(57) ABSTRACT

A cyclopentene ring-opening polymer having, at a polymer chain end, a structure where a polymer chain and a group containing an alkoxysilyl group are bonded through —NH— and having a weight average molecular weight of 100,000 to 1,000,000, wherein the structure is a structure represented by the following general formula (1):

$$pCP—Y1-NH—Y2-Si(OR1)a(R2)3-a \qquad (1)$$

where, in the general formula (1), pCP represents a cyclopentene ring-opening polymer chain, Y1 represents a bivalent hydrocarbon group having 1 to 20 carbon atoms, each of R1 and R2 represents a hydrocarbon group having 1 to 20 carbon atoms, Y2 represents a bivalent hydrocarbon group having 1 to 20 carbon atoms in which —NH— may be interposed, and "a" is an integer of 1 to 3.

17 Claims, No Drawings

CYCLOPENTENE RING-OPENING POLYMER AND METHOD OF PRODUCTION OF SAME, POLYMER COMPOSITION, AND CROSS-LINKED POLYMER

TECHNICAL FIELD

The present invention relates to a cyclopentene ring-opening polymer and a method of production of the same and to a polymer composition, more particularly relates to a cyclopentene ring-opening polymer able to give a polymer composition having a low heat buildup property due to a high affinity with a filler such as carbon black or silica and suitable as a material of a low fuel consumption tire, and to a method of production of the same and a polymer composition.

BACKGROUND ART

A cyclopentene ring-opening polymer obtained by metathesis ring-opening polymerization of cyclopentene is widely known as a rubber material. It is used as various types of rubber materials by mixing in for example a filler such as carbon black or silica. In general, a cyclopentene ring-opening polymer, as for example disclosed in Patent Document 1, is produced by bulk polymerization or solution polymerization using a so-called Ziegler-Natta catalyst comprised of a transition metal compound of Group VI of the Periodic Table such as $WCl_6$ or $MoCl_5$ and an organometallic compound such as an aluminum compound or tin compound. In some cases, a molecular weight adjuster comprised of an α-olefin is added. The thus obtained cyclopentene ring-opening polymer is comprised only of carbon atoms and hydrogen atoms, so is low in affinity with a filler such as carbon black or silica. For this reason, even if mixing a filler into such a cyclopentene ring-opening polymer to form a polymer composition, the effect of improvement of mechanical properties by mixing in the filler will not be sufficiently realized.

As a technique to improve the affinity of a cyclopentene ring-opening polymer with a filler, Patent Document 2 proposes the method of ring-opening polymerization of cyclopentene in the presence of a compound having a functional group and ethylenically unsaturated bond (for example, allyltrimethoxysilane etc.) using a ruthenium carbene complex as a catalyst and introducing a functional group to a cyclopentene ring-opening polymer chain end by a metathesis reaction of the cyclopentene ring-opening polymer chain end and an ethylenically unsaturated bond. The cyclopentene ring-opening polymer having a functional group at a polymer chain end obtained by this method is greatly improved in affinity with a filler compared with a cyclopentene ring-opening polymer not having a functional group.

However, if considering the rising demands for low fuel consumption performance from tires in recent years, when using a polymer composition containing a cyclopentene ring-opening polymer and filler as a composition for tire applications, improvement of the low heat buildup property of the polymer composition is desirable even for the cyclopentene ring-opening polymer obtained by the method described in Patent Document 2. For example, even if introducing an alkoxysilyl group into a cyclopentene ring-opening polymer chain end by using the method of Patent Document 2, an alkoxysilyl group being considered to have excellent performance as a functional group introduced for improving the affinity with a filler in the styrene-butadiene rubber which is currently broadly used for tire applications, there would still be room for improvement of the low heat buildup property in the polymer composition obtained by the same.

RELATED ART

Patent Documents

Patent Document 1: Japanese Patent Publication No. 54-50598A
Patent Document 2: Japanese Patent Publication No. 2010-37362A

SUMMARY OF THE INVENTION

Problem to be Solved by the Invention

An object of the present invention is to provide a cyclopentene ring-opening polymer improved in affinity with a filler which can give a polymer composition having an excellent low heat buildup property and provide a method of production of a cyclopentene ring-opening polymer which can efficiently produce such a cyclopentene ring-opening polymer. Further, it is to provide a polymer composition having an excellent low heat buildup property.

Means for Solving the Problem

The inventors engaged in intensive research to achieve the above object and as a result discovered that a cyclopentene ring-opening polymer obtained by reacting a cyclopentene ring-opening polymer having a halogen atom at a polymer chain end and a compound having an alkoxysilyl group and amino group in its molecule is more excellent in affinity with a filler compared with a conventional cyclopentene ring-opening polymer and that a polymer composition obtained using the same has an excellent low heat buildup property. The present invention was completed based on this discovery.

Therefore, according to the present invention, the following [1] to [7] are provided:

[1] A cyclopentene ring-opening polymer having, at a polymer chain end, a structure where a polymer chain and a group containing an alkoxysilyl group are bonded through —NH— and having a weight average molecular weight of 100,000 to 1,000,000, wherein the structure is a structure represented by the following general formula (1):

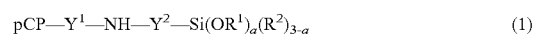

$$pCP—Y^1—NH—Y^2—Si(OR^1)_a(R^2)_{3-a} \qquad (1)$$

where, in the general formula (1), pCP represents a cyclopentene ring-opening polymer chain, $Y^1$ represents a bivalent hydrocarbon group having 1 to 20 carbon atoms, each of $R^1$ and $R^2$ represents a hydrocarbon group having 1 to 20 carbon atoms, $Y^2$ represents a bivalent hydrocarbon group having 1 to 20 carbon atoms in which —NH— may be interposed, and "a" is an integer of 1 to 3,

[2] The cyclopentene ring-opening polymer according to [1], wherein the group containing an alkoxysilyl group is a group containing a trialkoxysilyl group,

[3] A method of production of a cyclopentene ring-opening polymer according to [1] or [2], comprising producing a cyclopentene ring-opening polymer having a halogen atom at a polymer chain end, and then causing the halogen atom of the cyclopentene ring-opening polymer having a halogen atom at a polymer chain end to react with the amino group of a compound containing an alkoxysilyl group and amino group in its molecule,

[4] A polymer composition comprising a polymer component containing the cyclopentene ring-opening polymer according to [1] or [2] into which 10 to 150 parts by weight of silica or 10 to 150 parts by weight of silica and carbon black in total are mixed with respect to 100 parts by weight of the polymer component,

[5] A polymer composition comprising a cyclopentene ring-opening polymer having, at a polymer chain end, a structure where a polymer chain and a group containing an alkoxysilyl group are bonded through —NH—, the cyclopentene ring-opening polymer being obtained by mixing and reacting, with respect to 100 parts by weight of a polymer component including a cyclopentene ring-opening polymer having a halogen atom at a polymer chain end, 10 to 150 parts by weight of silica or 10 to 150 parts by weight of silica and carbon black in total and 0.01 to 20 parts by weight of a compound containing an alkoxysilyl group and amino group in its molecule, wherein the structure is a structure represented by the following general formula (1):

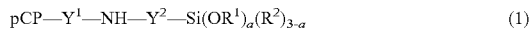

pCP—$Y^1$—NH—$Y^2$—Si(OR$^1$)$_a$(R$^2$)$_{3-a}$  (1)

where, in the general formula (1), pCP represents a cyclopentene ring-opening polymer chain, $Y^1$ represents a bivalent hydrocarbon group having 1 to 20 carbon atoms, each of $R^1$ and $R^2$ represents a hydrocarbon group having 1 to 20 carbon atoms, $Y^2$ represents a bivalent hydrocarbon group having 1 to 20 carbon atoms in which —NH— may be interposed, and "a" is an integer of 1 to 3,

[6] The polymer composition according to [4] or [5], further comprising a cross-linking agent, and

[7] A cross-linked polymer obtained by cross-linking the polymer composition according to [6].

Effects of Invention

According to the present invention, there are provided a cyclopentene ring-opening polymer improved in affinity with a filler which can give a polymer composition having an excellent low heat buildup property and a method of production of a cyclopentene ring-opening polymer which can efficiently produce such a cyclopentene ring-opening polymer. Further, there is provided a polymer composition having an excellent low heat buildup property.

DESCRIPTION OF EMBODIMENTS

The cyclopentene ring-opening polymer of the present invention is a cyclopentene ring-opening polymer having, at a polymer chain end, a structure where a polymer chain and a group containing an alkoxysilyl group are bonded through —NH— and having a weight average molecular weight of 100,000 to 1,000,000, in the cyclopentene ring-opening polymer, the structure being a structure represented by the following general formula (1):

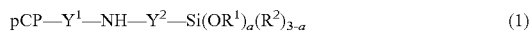

pCP—$Y^1$—NH—$Y^2$—Si(OR$^1$)$_a$(R$^2$)$_{3-a}$  (1)

where, in the general formula (1), pCP represents a cyclopentene ring-opening polymer chain, $Y^1$ represents a bivalent hydrocarbon group having 1 to 20 carbon atoms, each of $R^1$ and $R^2$ represents a hydrocarbon group having 1 to 20 carbon atoms, $Y^2$ represents a bivalent hydrocarbon group having 1 to 20 carbon atoms in which —NH— may be interposed, and "a" is an integer of 1 to 3.

The cyclopentene ring-opening polymer of the present invention has a structure where the end of a polymer chain formed by repeating units comprised of cyclopentene which are ring-opening polymerized and a group containing an alkoxysilyl group are bonded through —NH— (below, sometimes called a "specific end structure"). Here, the group containing an alkoxysilyl group forming the specific end structure of the cyclopentene ring-opening polymer of the present invention is a group represented by the following general formula (2):

—$Y^2$—Si(OR$^1$)$_a$(R$^2$)$_{3-a}$  (2)

where, in the general formula (2), $R^1$, $R^2$, $Y^2$, and "a" are the same as in the general formula (1).

The alkoxysilyl group contained in the group containing an alkoxysilyl group, as shown in the general formulas (1) and (2), may be any of a monoalkoxysilyl group, dialkoxysilyl group, and trialkoxysilyl group. Further, the alkoxy group bonded with the silicon atom in the alkoxysilyl group (that is, in the general formulas (1) and (2), group represented by OR$^1$) is an alkoxy group having 1 to 20 carbon atoms, preferably an alkoxy group having 1 to 10 carbon atoms, more preferably a methoxy group or ethoxy group. When the alkoxysilyl group is a monoalkoxysilyl group (that is, in the general formulas (1) and (2), when a=1) or a dialkoxysilyl group (that is, in the general formulas (1) and (2), when a=2), the group bonding with the silicon atom other than the alkoxy group (that is, in the general formulas (1) and (2), group represented by R$^2$) is a hydrocarbon group having 1 to 20 carbon atoms. For example, an alkyl group having 1 to 20 carbon atoms, an aryl group having 6 to 20 carbon atoms, etc. may be mentioned. Preferably, it is an alkyl group having 1 to 10 carbon atoms, more preferably a methyl group or an ethyl group.

As specific examples of the alkoxysilyl group, a trialkoxysilyl group such as a trimethoxysilyl group and triethoxysilyl group; a dialkoxyalkylsilyl group such as a dimethoxymethylsilyl group, diethoxymethylsilyl group, dimethoxyethylsilyl group, and diethoxyethylsilyl group; a monoalkoxydialkylsilyl group such as a methoxydimethylsilyl group, ethoxydimethylsilyl group, methoxydiethylsilyl group, and ethoxydiethylsilyl group; etc. may be mentioned, but it is not limited to these.

The group containing an alkoxysilyl group forming the specific end structure contains as a binding group between the alkoxysilyl group and —NH— (in the general formulas (1) and (2), group represented by $Y^2$) a bivalent hydrocarbon group having 1 to 20 carbon atoms in which —NH— may be interposed. As such a binding group, a bivalent hydrocarbon group having 1 to 10 carbon atoms in which —NH— may be interposed is more preferable. As specific examples of the bivalent hydrocarbon group having 1 to 20 carbon atoms in which —NH— may be interposed, —CH$_2$CH$_2$NH(CH$_2$)$_3$—, —CH$_2$CH$_2$CH$_2$—, etc. may be mentioned.

As specific examples of the group containing an alkoxysilyl group (in the general formulas (1) and (2), group represented by —$Y^2$—Si(OR$^1$)$_a$(R$^2$)$_{3-a}$), 2-(trimethoxysilyl)ethyl group, 3-(trimethoxysilyl)propyl group, 4-(trimethoxysilyl)butyl group, 6-(trimethoxysilyl) hexyl group, 8-(trimethoxysilyl)octyl group, 2-(triethoxysilyl)ethyl group, 3-(triethoxysilyl)propyl group, 4-(triethoxysilyl)butyl group, 6-(triethoxysilyl)hexyl group, 8-(triethoxysilyl)octyl group, 2-(dimethoxymethylsilyl)ethyl group, 3-(dimethoxymethylsilyl)propyl group, 4-(dimethoxymethylsilyl)butyl group, 2-(diethoxymethylsilyl)ethyl group, 3-(diethoxymethylsilyl)propyl group, 4-(diethoxymethylsilyl)butyl group, 2-(dimethoxyethylsilyl)ethyl group, 2-(diethoxyethylsilyl)ethyl group, 2-(diethylmethoxysilyl)ethyl group, and 2-(dimethylethoxysilyl)ethyl group may be mentioned, but it is not limited to these.

Further, the cyclopentene ring-opening polymer of the present invention, as shown in the general formula (1), has, at a polymer chain end, a structure where the group containing an alkoxysilyl group represented by the abovemention general formula (2) is bonded with the polymer chain through —NH—. In the general formula (1), the binding group bonding the cyclopentene ring-opening polymer chain represented by pCP and —NH—, that is, the group represented by $Y^1$ in the general formula (1), is a bivalent hydrocarbon group having 1 to 20 carbon atoms, preferably a bivalent hydrocarbon group having 1 to 10 carbon atoms.

The cyclopentene ring-opening polymer of the present invention may be one in which the specific end structure is introduced to only one polymer chain end (single end) or may be one in which the specific end structure is introduced to both polymer chain ends (double ends). Further, these may be mixed. Furthermore, a cyclopentene ring-opening polymer in which the specific end structure is not introduced may be mixed in as well.

In the cyclopentene ring-opening polymer of the present invention, the ratio of introduction of the specific end structure to the polymer chain ends is not particularly limited, but from the viewpoint of particularly improving the affinity between the cyclopentene ring-opening polymer and filler, the value of the percentage of (number of cyclopentene ring-opening polymer chain ends into which specific end structure is introduced/total number of cyclopentene ring-opening polymer chain ends) is preferably 20% or more, more preferably 25% or more, still more preferably 30% or more. Note that, in the cyclopentene ring-opening polymer of the present invention, the ratio of introduction of the specific end structure to the polymer chain ends can be found by measurement by $^1$H-NMR spectroscopy and measurement by gel permeation chromatography (GPC). Specifically, it can be found by comparing the integral values of the peaks derived from protons of the carbon-carbon double bonds present in the main chain of the cyclopentene ring-opening polymer by measurement of the $^1$H-NMR spectrum, the integral values derived from the specific end structures, and the number average molecular weight (Mn) obtained by GPC measurement.

The cyclopentene ring opening polymer of the present invention may be one where the repeating units forming the main chain are comprised of only repeating units where cyclopentene is polymerized by ring-opening polymerization, but it may also containing repeating units derived from another monomer able to copolymerize with the cyclopentene. However, from the viewpoint of improving the properties of the cyclopentene ring-opening polymer, the ratio of repeating units derived from these other monomers is preferably 20 mol % or less with respect to the total repeating units, more preferably 15 mol % or less, still more preferably 10 mol % or less. As the other monomer able to copolymerize with the cyclopentene, a monocyclic olefin other than cyclopentene, a monocyclic diene, a monocyclic triene, a polycyclic cyclic olefin, a polycyclic cyclic diene, a polycyclic cyclic triene, etc. may be mentioned. As the monocyclic olefin other than cyclopentene, substituted cyclopentene and substituted or unsubstituted cycloctene may be illustrated. As the monocyclic diene, substituted or unsubstituted 1,5-cyclooctadiene may be illustrated. As the monocyclic triene, substituted or unsubstituted 1,5,9-cyclododecatriene may be illustrated. Further, as the polycyclic cyclic olefin, a substituted or unsubstituted norbornene compound may be illustrated.

The molecular weight of the cyclopentene ring-opening polymer of the present invention is, in terms of the value of the weight average molecular weight (Mw), 100,000 to 1,000,000, preferably 150,000 to 900,000, more preferably 200,000 to 800,000. By the cyclopentene ring-opening polymer having such a molecular weight, a polymer composition having excellent mechanical properties can be given.

Further, the ratio (Mw/Mn) of the number average molecular weight (Mn) and the weight average molecular weight (Mw), converted to polystyrene, of the cyclopentene ring-opening polymer of the present invention measured by gel permeation chromatography is not particularly limited, but is usually 4.0 or less, preferably 3.5 or less, more preferably 3.0 or less. By having such an Mw/Mn, it becomes possible to give a polymer composition having more superior mechanical properties.

Note that, in the present invention, the molecular weight of the cyclopentene ring-opening polymer is measured by gel permeation chromatography as a value converted to polystyrene.

In the double bonds present in the repeating units forming the cyclopentene ring-opening polymer of the present invention, the cis/trans ratio is not particularly limited, but it is usually set to 10/90 to 90/10 in range, but from the viewpoint of obtaining a cyclopentene ring-opening polymer able to give a polymer composition exhibiting excellent characteristics at a low temperature, 30/70 to 90/10 in range is preferable.

The method of production of such a cyclopentene ring-opening polymer of the present invention is not particularly limited, but the method of production suitably used is the following explained method of production of a cyclopentene ring-opening polymer of the present invention.

The method of production of the cyclopentene ring-opening polymer of the present invention comprises producing a cyclopentene ring-opening polymer having a halogen atom at a polymer chain end, then causing the halogen atom of the cyclopentene ring-opening polymer to react with the amino group of a compound containing an alkoxysilyl group and amino group in its molecule.

In the method of production of the cyclopentene ring-opening polymer of the present invention, first, a cyclopentene ring-opening polymer having a halogen atom at a polymer chain end is produced. The cyclopentene ring-opening polymer having a halogen atom at a polymer chain end may be produced by a known method. The method is not particularly limited, but the method of ring-opening polymerizing cyclopentene by using a ring-opening polymerization catalyst in the presence of an olefin compound having a halogen atom is preferable.

In the method of ring-opening polymerization of cyclopentene in the presence of an olefin compound having a halogen atom, the olefin compound having a halogen atom able to be used is not particularly limited so long as a compound contains at least one of each of the ethylenically unsaturated bond and halogen atom in its molecule. As specific examples of the olefin compound having a halogen atom, an olefin compound containing a halogen atom at one side of the olefin such as allyl chloride, allyl bromide, allyl iodide, crotyl chloride, 4-chloro-1-butene, 5-bromo-1-pentene, 6-chloro-1-hexene, 4-chlorostyrene, and 4-bromostyrene; an olefin compound containing halogen atoms at both sides of the olefin such as 1,4-dichloro-2-butene and 1,4-dibromo-2-butene; etc. may be mentioned. Note that, the olefin compound having a halogen atom may be used as a single type alone or as two types or more combined.

Further, as the ring-opening polymerization catalyst able to be used in the method of ring-opening polymerization of the cyclopentene in the presence of an olefin compound having a halogen atom, a ruthenium carbene complex may be mentioned.

The ruthenium carbene complex is not particularly limited so long as one acting as a ring-opening polymerization catalyst of cyclopentene. As specific examples of the ruthenium carbene complex preferably used, bis(tricyclohexylphosphine)benzylideneruthenium dichloride, bis(triphenylphosphine)-3,3-diphenylpropenylideneruthenium dichloride, bis(tricyclohexylphosphine)t-butylvinylideneruthenium dichloride, bis(1,3-diisopropylimidazolin-2-ylidene) benzylideneruthenium dichloride, bis(1,3-dicyclohexylimidazolin-2-ylidene)benzylideneruthenium dichloride, (1,3-dimesitylimidazolin-2-ylidene)(tricyclohexylphosphine)benzylideneruthenium dichloride, (1,3-dimesitylimidazolidin-2-ylidene)(tricyclohexylphosphine) benzylideneruthenium dichloride, bis(tricyclohexylphosphine) ethoxymethylideneruthenium dichloride, and (1,3-dimesitylimidazolidin-2-ylidene)(tricyclohexylphosphine) ethoxymethylideneruthenium dichloride may be mentioned.

The amount of use of the ruthenium carbene complex is not particularly limited, but in terms of the molar ratio of the (metal ruthenium in the catalyst: monomer) is usually 1:2,000 to 1:2,000,000, preferably 1:5,000 to 1:1,500,000, more preferably 1:10,000 to 1:1,000,000 in range. If the amount of use is too small, sometimes the polymerization reaction will not sufficiently proceed. On the other hand, if too large, removal of the catalyst residue from the obtained cyclopentene ring-opening polymer will become difficult.

The polymerization reaction may be performed with no solvent or may be performed in a solution. If performing the polymerization in a solution, the solvent which is used is not particularly limited so long as the solvent which is inert in the polymerization reaction and can dissolve the cyclopentene and polymerization catalyst, etc. used for the polymerization, but a hydrocarbon-based solvent or a halogen-based solvent is preferably used. As the hydrocarbon-based solvent, for example, an aromatic hydrocarbon such as benzene, toluene, xylene, and ethylbenzene; an aliphatic hydrocarbon such as n-hexane, n-heptane, and n-octane; an alicyclic hydrocarbon such as cyclohexane, cyclopentane, and methylcyclohexane; etc. may be mentioned. Further, as the halogen-based solvent, for example, an alkyl halogen such as dichloromethane and chloroform; an aromatic halogen such as chlorobenzene and dichlorobenzene; etc. may be mentioned.

The polymerization temperature is not particularly limited, but is usually set as −50 to 100° C. in range. Further, the polymerization reaction time is preferably 1 minute to 72 hours, more preferably 5 hours to 20 hours. By adding a known polymerization terminator to the polymerization system after the polymerization conversion rate reaches a predetermined value, it is possible to make the polymerization reaction stop.

By doing this, it is possible to obtain a polymer solution containing a cyclopentene ring-opening polymer having a halogen atom at a polymer chain end. The cyclopentene ring-opening polymer having a halogen atom at a polymer chain end may be recovered from the polymer solution and then used for the reaction with a compound containing an alkoxysilyl group and amino group in its molecule. Alternatively, the polymer solution can be directly used for reaction with the compound containing an alkoxysilyl group and amino group in its molecule. When recovering the polymer from the polymer solution, a known recovery method may be employed. For example, the method of using steam stripping etc. to separate the solvent, then separating the solids by filtration and drying the same to obtain a solid state polymer may be employed.

Note that, the cyclopentene ring-opening polymer obtained using a ruthenium carbene complex tends to easily become high in ratio of trans structures in the double bonds present in the repeating units, so sometimes has crystallinity at a relatively low temperature and therefore sometimes becomes inferior in properties as a rubber material. From the viewpoint of preventing this, the cyclopentene is preferably made to copolymerize with another monomer. As specific examples of the other monomer able to be copolymerized with the cyclopentene able to be used in this case, cyclooctene, 1,5-cyclooctadiene, and 1,5,9-cyclododecatriene may be mentioned.

As another ring-opening polymerization catalyst able to be used in the method of ring-opening polymerization of cyclopentene in the presence of an olefin compound having a halogen atom, a molybdenum compound or a tungsten compound may be mentioned. As specific examples of the molybdenum compound able to be used as a ring-opening polymerization catalyst, molybdenum pentachloride, molybdenum oxotetrachloride, and molybdenum (phenylimido)tetrachloride may be mentioned. Further, as specific examples of the tungsten compound, tungsten hexachloride, tungsten oxotetrachloride, tungsten (phenylimido)tetrachloride, monocatecholatetungsten tetrachloride, bis(3,5-di-t-butyl)catecholatetungsten dichloride, bis (2-chloroetherate)tetrachloride, and tungsten oxotetraphenolate may be mentioned.

When using a molybdenum compound or tungsten compound as a ring-opening polymerization catalyst, it is possible to use a co-catalyst comprised of an organometallic compound combined with it. As the organometallic compound able to be used as a co-catalyst, an organometallic compound of metal atoms of Group I, II, XII, XIII, or XIV of the Periodic Table having hydrocarbon groups having 1 to 20 carbon atoms may be mentioned. Among these, an organolithium compound, organomagnesium compound, organozinc compound, organoaluminum compound, or organotin compound is preferably used, while an organolithium compound, organotin compound, or organoaluminum compound is more preferably used and organoaluminum is particularly preferably used.

As specific examples of the organolithium compound able to be used as a co-catalyst, n-butyllithium, methyllithium, phenyllithium, neopentyllithium, and neophyllithium may be mentioned. As specific examples of the organomagnesium compounds, butylethylmagnesium, butyloctylmagnesium, dihexylmagnesium, ethylmagnesium chloride, n-butylmagnesium choride, allylmagnesium bromide, neopentylmagnesium chloride, and neophylmagnesium chloride may be mentioned. As specific examples of the organozinc compounds, dimethylzinc, diethylzinc, and diphenylzinc may be mentioned. As specific examples of the organotin compound, tetramethyltin, tetra(n-butyl)tin, and tetraphenyltin may be mentioned. As specific examples of the organoaluminum compound, trialkylaluminum such as trimethylaluminum, triethylaluminum, and triisobutylaluminum; alkylaluminum halides such as diethylaluminum chloride, ethylaluminum sesquichloride, and ethylaluminum dichloride; compounds represented by the following general formula (3); etc. may be mentioned.

$$(R^3)_{3-x}Al(OR^4)_x \quad (3)$$

where, in the general formula (3), each of $R^3$ and $R^4$ represents hydrocarbon group having 1 to 20 carbon atoms, and "x" is 0<x<3.

As specific examples of the hydrocarbon group having 1 to 20 carbon atoms represented by $R^3$ and $R^4$ in the general formula (3), an alkyl group such as a methyl group, ethyl group, isopropyl group, n-propyl group, isobutyl group, n-butyl group, t-butyl group, n-hexyl group, and cyclohexyl group; an aryl group such as a phenyl group, 4-methylphenyl group, 2,6-dimethylphenyl group, 2,6-diisopropylphenyl group, and naphthyl group; etc. may be mentioned. Note that, the hydrocarbon group having 1 to 20 carbon atoms represented by $R^3$ and $R^4$ may be the same or may be different, but from the viewpoint of raising the ratio of cis structures in the double bonds present in the repeating units of the cyclopentene ring-opening polymer and obtaining a cyclopentene ring-opening polymer excellent in properties as a rubber material, at least the hydrocarbon group represented by $R^4$ is preferably an alkyl group having 4 or more carbon atoms consecutively bonded together. In particular, it is preferably any of an n-butyl group, 2-methylpentyl group, n-hexyl group, cyclohexyl group, n-octyl group, and n-decyl group.

Further, in the general formula (3), "x" is 0<x<3, but from the viewpoint of raising the ratio of cis structures in the double bonds present in the repeating units of the cyclopentene ring-opening polymer and obtaining a cyclopentene ring-opening polymer excellent in properties as a rubber material, an organoaluminum compound where the "x" in the general formula (3) is 0.5<x<1.5 in range is preferably used as a co-catalyst.

The polymerization reaction conditions etc. in the case of using a molybdenum compound or tungsten compound as a ring-opening polymerization catalyst may be suitably selected in the range explained in the case of using a ruthenium carbene complex.

The polymer solution containing a cyclopentene ring-opening polymer having a halogen atom at a polymer chain end obtained in the above way, in the same way as explained above, can be used for a reaction with the compound containing an alkoxysilyl group and amino group in its molecule.

In the method of production of the cyclopentene ring-opening polymer of the present invention, for example, the cyclopentene ring-opening polymer having a halogen atom at a polymer chain end is produced in the above way, then the halogen atom of the cyclopentene ring-opening polymer and the amino group of the compound containing an alkoxysilyl group and amino group in its molecule is caused to react so as to form an —NH— bond and to obtain the cyclopentene ring-opening polymer of the present invention. Note that, due to this reaction, the hydrocarbon group derived from an olefin compound having a halogen atom explained above forms the $Y^1$ in the general formula (1). The compound containing an alkoxysilyl group and amino group in its molecule used in the method of production of the cyclopentene ring-opening polymer of the present invention is a compound having at least one of each of alkoxysilyl group and amino group in its molecule. Specifically, a compound represented by the following general formula (4) may be mentioned.

$$H_2N\text{—}Y^3\text{—}Si(OR^5)_b(R^6)_{3-b} \quad (4)$$

where, in the general formula (4), each of $R^5$ and $R^6$ represents a hydrocarbon group having 1 to 20 carbon atoms, while $Y^3$ represents a bivalent hydrocarbon group having 1 to 20 carbon atoms in which —NH— may be interposed. "b" is an integer of 1 to 3.

In the general formula (4), each of $R^5$ and $R^6$ is a hydrocarbon group having 1 to 20 carbon atoms. For example, an alkyl group having 1 to 20 carbon atoms, aryl group having 6 to 20 carbon atoms, etc. may be mentioned. An alkyl group having 1 to 10 carbon atoms is preferable, methyl group and ethyl group are more preferable.

In the general formula (4), $Y^3$ is a bivalent hydrocarbon group having 1 to 20 carbon atoms in which —NH— may be interposed. A bivalent hydrocarbon group having 1 to 10 carbon atoms in which —NH— may be interposed is preferable.

Among the compounds represented by the general formula (4) as well, as particularly preferably used compounds, N-(2-aminoethyl)-3-aminopropyltrimethoxysilane, N-(2-aminoethyl)-3-aminopropylmethyldimethoxysilane, 4-amino-3,3-dimethylbutyltrimethoxysilane, (aminoethylaminomethyl)phenetyltrimethoxysilane, N-(6-aminoethyl) aminomethyltriethoxysilane, 3-(aminophenoxy)propyltrimethoxysilane, aminophenyltrimethoxysilane, 3-aminopropyldimethylethoxysilane, 3-aminopropylmethyldiethoxysilane, 3-aminopropyltriethoxysilane, 3-aminopropyltrimethoxysilane, etc. may be mentioned.

The conditions for causing the halogen atom of the cyclopentene ring-opening polymer and the amino group of the compound containing an alkoxysilyl group and amino group in its molecule to react are not particularly limited. For example, it is possible to react these by heating in a solvent or not in a solvent to 20 to 200° C. As the solvent in the case of use of a solvent, it is possible to use a solvent similar to the solvent used in the polymerization reaction. Further, a reaction catalyst may be added as required for the reaction. The catalyst used is not particularly limited. For example, a basic catalyst such as an organic amine like triethylamine or ethylenediamine can be used. When causing the reaction not in the presence of a solvent, the reaction may be caused simultaneously with the kneading at the time of mixing in the filler explained later. Note that, in the cyclopentene ring-opening polymer of the present invention, a structure where a polymer chain and a group containing an alkoxysilyl group are bonded through —NH— also includes an ammonium salt structure such as "—NH$_2^+$(X$^-$)—". Here, X represents the halogen atom of a cyclopentene ring-opening polymer having a halogen atom at the polymer chain end. That is, in the present invention, the structure represented by the above general formula (1) also includes a structure represented by the following general formula (5):

$$pCP\text{—}Y^1\text{—}NH_2^+(X^-)\text{—}Y^2\text{—}Si(OR^1)_a(R^2)_{3-a} \quad (5)$$

The reaction ratio of the halogen atom of the cyclopentene ring-opening polymer and the amino group of the compound containing an alkoxysilyl group and amino group in its molecule may be determined in accordance with the desired ratio of introduction of the specific end structure etc. It is not particularly limited, but the molar ratio of halogen atoms: amino groups is usually 1:1 to 1:200 in range, preferably 1:1 to 1:100 in range.

According to the method of production of the cyclopentene ring-opening polymer of the present invention explained above, the cyclopentene ring-opening polymer of the present invention can be efficiently produced. Note that, the obtained cyclopentene ring-opening polymer may further have added to it, as desired, an antioxidant such as a phenol-based stabilizer, a phosphorus-based stabilizer, and a sulfur-based stabilizer. The amount of the antioxidant added may be suitably selected in accordance with the type. Further, extension oil may be mixed in as desired. When obtaining a cyclopentene ring-opening polymer as the polymer solution, a known recovery method may be employed for recovering the polymer from the polymer solution. For example, the method of pouring the polymer solution into an excess of a poor solvent so as to recover the polymer by coagulation, the method of using steam stripping etc. to separate the solvent, then separating the solids by filtration and further drying these to obtain a solid state polymer may be employed.

The polymer composition of the present invention is a polymer composition containing the cyclopentene ring-opening polymer of the present invention and silica or both of silica and carbon black as a filler.

As specific examples of the silica used in the polymer composition of the present invention, for example, dry type white carbon, wet type white carbon, colloidal silica, and precipitated silica disclosed in Japanese Patent Publication No. 62-62838A may be mentioned. Among these as well, wet type white carbon containing hydrous silicic acid as a main ingredient is preferable. Further, a carbon-silica dual phase filler comprised of carbon black on the surface of which silica is carried may also be used. These silica may be used respectively alone or as two types or more combined.

The nitrogen adsorption specific surface area of the silica (measured by BET method based on ASTM D3037-81) is preferably 50 to 400 m$^2$/g, more preferably 100 to 220 m$^2$/g. Further, the pH of the silica is preferably less than pH7, more preferably is pH5 to 6.9. If pH is in these ranges, the affinity between the cyclopentene ring-opening polymer and the silica becomes particularly good.

The amount of the silica is not particularly limited, but is preferably 10 to 150 parts by weight with respect to 100 parts by weight of the polymer component containing the cyclopentene ring-opening polymer which is contained in the polymer composition, more preferably 20 to 120 parts by weight, particularly preferably 40 to 100 parts by weight. By making the amount of the silica the above range, it is possible to make the low heat buildup property of the rubber composition particularly good.

When using silica as a filler, the polymer composition preferably further contains a silane coupling agent mixed into it for the purpose of improving the adhesion between the cyclopentene ring-opening polymer and the silica. As the silane coupling agent, for example, vinyltriethoxysilane, β-(3,4-epoxycyclohexyl)ethyltrimethoxysilane, bis(3-(triethoxysilyl)propyl)tetrasulfide, bis(3-(triethoxysilyl)propyl) disulfide, etc. or the tetrasulfides described in Japanese Patent Publication No. 6-248116A such as γ-trimethoxysilylpropyldimethylthiocarbamyl tetrasulfide and γ-trimethoxysilylpropylbenzothiazyl tetrasulfide etc. may be mentioned. Among these, tetrasulfides are preferable. These silane coupling agents can be used respectively alone or as two types or more combined. The amount of the silane coupling agent is preferably 0.1 to 30 parts by weight with respect to 100 parts by weight of silica, more preferably 1 to 15 parts by weight.

The polymer composition of the present invention may further contain carbon black as a filler. As the carbon black able to be used in the polymer composition of the present invention, for example, furnace black, acetylene black, thermal black, channel black, and graphite may be mentioned. Among these as well, furnace black is preferable. As specific examples, SAF, ISAF, ISAF-HS, ISAF-LS, IISAF-HS, HAF, HAF-HS, HAF-LS, FEF, etc. may be mentioned. These carbon black may be used respectively alone or as two types or more combined. The content of the carbon black is usually 150 parts by weight or less with respect to 100 parts by weight of the polymer component containing the cyclopentene ring-opening polymer which is contained in the polymer composition. Further, when jointly using silica and carbon black, the total amount of the silica and the carbon black is preferably made to become 10 to 150 parts by weight with respect to 100 parts by weight of the polymer component containing the cyclopentene ring-opening polymer which is contained in the polymer composition, more preferably 30 to 150 parts by weight.

The nitrogen adsorption specific surface area (N$_2$SA) of the carbon black is preferably 5 to 200 m$^2$/g, more preferably 80 to 130 m$^2$/g, while the dibutyl phthalate (DBP) adsorption amount is preferably 5 to 300 ml/100 g, more preferably 80 to 160 ml/100 g.

The polymer composition of the present invention may further contain rubber other than the cyclopentene ring-opening polymer of the present invention. As the rubber other than the cyclopentene ring-opening polymer of the present invention, for example, natural rubber (NR), polyisoprene rubber (IR), emulsion polymerized SBR (styrene-butadiene copolymer rubber), solution polymerized random SBR (amount of bounded styrene 5 to 50 wt %, 1,2-bond content in butadiene part 10 to 80%), high trans SBR (trans bond content in butadiene part 70 to 95%), low cis BR (polybutadiene rubber), high cis BR, high trans BR (trans bond content in butadiene part 70 to 95%), styrene-isoprene copolymer rubber, butadiene-isoprene copolymer rubber, emulsion polymerized styrene-acrylonitrile-butadiene copolymer rubber, acrylonitrile-butadiene copolymer rubber, high vinyl SBR-low vinyl SBR block copolymer rubber, polyisoprene-SBR block copolymer rubber, polystyrene-polybutadiene-polystyrene block copolymer, acrylic rubber, epichlorohydrin rubber, fluororubber, silicone rubber, ethylene-propylene rubber, urethane rubber, etc. may be mentioned. Among these, NR, BR, IR, and SBR are preferably used. These rubbers can be used respectively alone or as two types or more combined.

When the polymer composition of the present invention contains rubber other than the cyclopentene ring-opening polymer of the present invention, the ratio of the cyclopentene ring-opening polymer is preferably made 10 wt % or more with respect to the total weight of the polymer component, more preferably 20 to 90 wt % in range, particularly preferably 30 to 80 wt % in range. If the ratio of the cyclopentene ring-opening polymer of the present invention is too low, the physical properties of the polymer composition are liable to be inferior.

The polymer composition of the present invention may contain, in addition to the above components, compounding agents such as a cross-linking agent, cross-linking accelerator, cross-linking activator, antioxidant, activator, process oil, plasticizer, and lubricant, mixed in necessary amounts by an ordinary method.

As the cross-linking agent, sulfurs such as powdered sulfur, precipitated sulfur, colloidal sulfur, insoluble sulfur, and high dispersion sulfur; halogenated sulfurs such as sulfur monochloride and sulfur dichloride; organic peroxides such as dicumyl peroxide and ditertiary butyl peroxide; quinonedioximes such as p-quinonedioxime, p,p'-dibenzoylquinonedioxime; organic polyvalent amine compounds such as triethylenetetramine, hexamethylenediamine carbamate, and 4,4'-methylenebis-o-chloroaniline; alkylphenol resin with a methylol group; etc. may be mentioned. Among these as well, sulfur is preferable while powdered sulfur is more preferable. These cross-linking agents are used respectively alone or as two types or more combined. The amount of the cross-linking agent is preferably 0.1 to 15 parts by weight with respect to 100 parts by weight of the polymer component containing the cyclopentene ring-opening polymer contained in the polymer composition, more preferably 0.5 to 5 parts by weight.

As the cross-linking accelerator, for example, a sulfenamide-based cross-linking accelerator such as N-cyclohexyl-2-benzothiazylsulfenamide, N-t-butyl-2-benzothiazolesulfenamide, N-oxyethylene-2-benzothiazolesulfenamide, N-oxyethylene-2-benzothiazolesulfenamide, and N,N'-diisopropyl-2-benzothiazolesulfenamide; a guanidine-based cross-linking accelerator such as diphenylguanidine, di-o-tolylguanidine, o-tolylbiguanidine; a thiourea-based cross-linking accelerator such as diethylthiourea; a thiazole-based cross-linking accelerator such as 2-mercaptobenzothiazole, diobenzothiazyl disulfide, and a 2-mercaptobenzothiazole zinc salt; a thiuram-based cross-linking accelerator such as tetramethylthiuram monosulfide and tetramethylthiuram disulfide; a dithiocarbamic acid-based cross-linking accelerator such as sodium dimethyldithiocarbamate and zinc diethyldithiocarbamate; a xanthogenic acid-based cross-linking accelerator such as sodium isopropyl xanthogenate, zinc isopropyl xanthogenate, and zinc butyl xanthogenate; and other cross-linking accelerators may be mentioned. Among these, one containing a sulfonamide-based cross-linking accelerator is preferable. These cross-linking accelerators may be respectively used alone or as two types or more combined. The amount of the cross-linking accelerator is preferably 0.1 to 15 parts by weight with respect to 100 parts by weight of the polymer component containing the cyclopentene ring-opening polymer contained in the polymer composition, more preferably 0.5 to 5 parts by weight.

As the cross-linking activator, for example, a higher fatty acid such as stearic acid or zinc oxide etc. may be used. The zinc oxide is preferably one with a high surface activity and with a particle size of 5 µm or less. For example, active zinc white with a particle size of 0.05 to 0.2 µm, zinc white of 0.3 to 1 µm, etc. may be mentioned. Further, as the zinc oxide, one treated on its surface by an amine-based dispersant or wetting agent etc. may be used. The amount of the cross-linking activator may be suitably selected, but the amount of the higher fatty acid is preferably 0.05 to 15 parts by weight with respect to 100 parts by weight of the polymer component containing the cyclopentene ring-opening polymer contained in the polymer composition, more preferably 0.5 to 5 parts by weight, while the amount of the zinc oxide is preferably 0.05 to 10 parts by weight with respect to 100 parts by weight of the polymer component containing the cyclopentene ring-opening polymer contained in the polymer composition, more preferably 0.5 to 3 parts by weight.

As the process oil, a mineral oil or synthetic oil may be used. As the mineral oil, an aroma oil, naphthene oil, paraffin oil, etc. are usually used. As other compounding agents, an activator such as diethyleneglycol, polyethyleneglycol, and silicone oil; a filler other than silica and carbon black such as calcium carbonate, talc, and clay; a tackifier such as a petroleum resin and coumarone resin; wax; etc. may be mentioned.

The polymer composition of the present invention can be obtained by kneading the each of components in accordance with an ordinary method. For example, the polymer composition can be obtained by kneading the polymer (rubber) such as the cyclopentene ring-opening polymer and the compounding agents other than the cross-linking agent and cross-linking accelerator, then mixing the cross-linking agent and cross-linking accelerator with the kneaded material. The mixing temperature of the cyclopentene ring-opening polymer and the compounding agents other than the cross-linking agent and cross-linking accelerator is preferably 80 to 200° C., more preferably 120 to 180° C., while the kneading time is preferably 30 seconds to 30 minutes. The cross-linking agent and the cross-linking accelerator are usually mixed in after cooling down to 100° C. or less, preferably 80° C. or less.

Further, the polymer composition of the present invention may be obtained by mixing and reacting, with respect to 100 parts by weight of the polymer component containing the cyclopentene ring-opening polymer having a halogen atom at the polymer chain end, 10 to 150 parts by weight of silica or 10 to 150 parts by weight of silica and carbon black in total and 0.01 to 20 parts by weight of a compound containing an alkoxysilyl group and amino group in its molecule.

In this case, the polymer composition of the present invention contains, as a polymer component, a cyclopentene ring-opening polymer having, at a polymer chain, a structure where a polymer chain end and a group containing an alkoxysilyl group are bonded through —NH—, that structure being a structure represented by the above general formula (1).

In this case, the ratio of the cyclopentene ring-opening polymer having a halogen atom at a polymer chain end in the polymer component for mixing and reacting silica or silica and carbon black and a compound containing an alkoxysilyl group and amino group in its molecule is preferably 10 wt % or more with respect to the total weight of the polymer component, more preferably 20 to 90 wt % in range, still more preferably 30 to 80 wt % in range.

In this case, as the compound containing an alkoxysilyl group and amino group in its molecule, the compound represented by the above-mentioned general formula (4) may be mentioned.

The polymer composition of the present invention is usually used as a cross-linked polymer by cross-linking. The cross-linking method is not particularly limited and may be suitably selected in accordance with the shape, size, etc. of the cross-linked polymer. The polymer composition may be cross-linked and shaped simultaneously by filling in a mold and heating or may be cross-linked by heating a preshaped polymer composition. The cross-linking temperature is preferably 120 to 200° C., more preferably 140 to 180° C., while the cross-linking time is usually 1 to 120 minutes or so.

The polymer composition of the present invention is excellent in affinity with silica and carbon black, so gives a cross-linked polymer excellent in low heat buildup property. Therefore, utilization for various applications making use of such characteristics, for example, various tire parts such as treads, carcasses, side walls, and beads or utilization for rubber products such as hoses, window frames, belts, shoes, shock absorbing rubber, and automobile parts and, furthermore, utilization as resin-reinforced rubber such as impact resistant polystyrene and ABS resin become possible. In particular, it is excellent for use as a tire tread of a low fuel consumption tire and is also suitable as the material for tire treads, side walls, undertreads, carcasses, beads, etc. of all season tires, high performance tires, studless tires, etc.

EXAMPLES

Below, the present invention will be explained based on more detailed examples, but the present invention is not limited to these examples. Note that, in the examples, "parts" are based on weight unless otherwise indicated. Further, the tests and evaluations were performed in accordance with the following descriptions.

[Molecular Weight]

Using a gel permeation chromatography (GPC) system HLC-8220 (made by Toso) and an H-type column HZ-M (made by Toso), measurement was performed at 40° C. using tetrahydrofuran as a solvent to find the number average molecular weight (Mn), weight average molecular weight (Mw), and molecular weight distribution (Mw/Mn) of the cyclopentene ring-opening polymer as values converted to polystyrene.

[Cis/Trans Ratio]

The ratio was determined by $^{13}$C-NMR spectroscopy.

[Ratio of Introduction of Functional Group in Cyclopentene Ring-Opening Polymer Having Functional Group at Polymer Chain End]

Using $^1$H-NMR spectroscopy, the ratio of the peak integral value derived from each type of functional group and the peak integral value derived from the carbon-carbon double bond in the cyclopentene ring-opening polymer main chain was found. The ratio of introduction of each type of functional group [percentage of (number of cyclopentene ring-opening polymer chain ends in which functional group was introduced/total number of cyclopentene ring-opening polymer chain ends)] was calculated based on the ratio of the peak integral values and the measurement value of the number average molecular weight (Mn) measured by GPC.

[Ratio of Introduction of Specific End Structure in Cyclopentene Ring-Opening Polymer]

Using $^1$H-NMR spectroscopy, the ratio of the peak integral value derived from an alkoxysilyl group and the peak integral value derived from the carbon-carbon double bond in the cyclopentene ring-opening polymer main chain was found. The ratio of introduction of the specific end structure [percentage of (number of cyclopentene ring-opening polymer chain ends in which specific end structure was introduced/total number of cyclopentene ring-opening polymer chain ends)] was calculated based on the ratio of the peak integral values and the value of the number average molecular weight (Mn) measured by GPC. Note that, in $^1$H-NMR spectroscopy, the presence of a peak derived from the alkoxysilyl groups appearing near 3.8 ppm and the peak derived from the methylene groups adjoining the —NH— appearing near 2.5 to 3.5 ppm was confirmed to confirm the introduction of the specific end structure.

[Evaluation of Affinity of Cyclopentene Ring-Opening Polymer With Filler]

1 part of the cyclopentene ring-opening polymer as a sample was dissolved in 18 parts of decalin, then 0.5 part of silica (product name "Zeosil 1165MP", made by Rhodia) and 0.5 part of carbon black (product name "Seast 7HM", made by Tokai Carbon) were added to this solution and the result stirred at 150° C. for 6 hours. Next, this solution was added to a large excess of isopropanol. The coagulated material formed due to this was recovered and dried in vacuo at 40° C. over 2 days. Further, the vacuum dried coagulate was placed in a wire basket and immersed in a large excess of toluene at 23° C. over 3 days to make the cyclopentene ring-opening polymer which is not bonded with the silica or carbon black dissolve. The coagulated material remaining inside the basket was washed by toluene, then dried by a vacuum drier and measured for weight after drying. The weight increased from the total 1 part of silica and carbon black used was found. The increased weight can be said to be the cyclopentene ring-opening polymer which is bonded with the silica and/or carbon black. The higher this value, the better the affinity with a filler can be said.

[Evaluation of Low Heat Buildup Property of Polymer Composition]

The polymer composition as a sample was cross-linked by hot pressing at 160° C. for 20 minutes to prepare a cross-linked test piece. The test piece was measured by a viscoelasticity measurement device (product name "EPLEXOR", made by GABO) under conditions of an initial strain 0.5%, dynamic strain 1%, and 10 Hz for obtaining the tan δ at 60° C. This value was indexed to the measurement value of the sample of Comparative Example 4 as 100. The smaller this index, the better the low heat buildup property can be said.

Production Example 1

Production of Cyclopentene Ring-Opening Polymer (A1) Having Bromine Atom at End of Polymer Chain In a nitrogen atmosphere, a pressure resistant glass reaction vessel equipped with a stirrer was charged with 200 parts of cyclopentene and 0.17 part of trans-1,4-dibromo-2-butene and 800 parts of toluene. Next, 4.3 parts of a 2.5 wt % diisobutylaluminum mono(n-hexyloxide)/toluene solution was added, then 8.7 parts of a 1.0 wt % $WCl_6$/toluene solution was added, and a polymerization reaction was performed at 25° C. for 6 hours. After 6 hours of the polymerization reaction, the pressure resistant glass reaction vessel was charged with an excess of isopropanol to stop the polymerization, then 0.15 part of an antioxidant comprised of Irganox 1520L (made by Ciba Specialty Chemicals) was added with respect to 100 parts of the obtained polymer, then steam stripping was used to remove the solvent and the residue was dried in vacuo at 60° C. for 24 hours to obtain 176 parts of a cyclopentene ring-opening polymer (A1) having a bromine atom at a polymer chain end. The weight average molecular weight (Mw) of the obtained cyclopentene ring-opening polymer (A1) was 380,000, the molecular weight distribution (Mw/Mn) was 1.92, and the cis/trans ratio was 60/40. Further, the ratio of introduction of bromine atoms to the ends of the polymer chains was 74%.

Production Example 2

Production of Cyclopentene Ring-Opening Polymer (A2) Having Chlorine Atom at End of Polymer Chain In a nitrogen atmosphere, a pressure resistant glass reaction vessel equipped with a magnetic stirrer was charged with 200 parts of cyclopentene and 0.24 part of 1,4-dichloro-2-butene (cis/trans mixture). Next, 0.050 part of (1,3-dimesitylimidazolidin-2-ylidene)(tricyclohexylphosphine)benzylideneruthenium dichloride dissolved in 10 parts of toluene was added and a polymerization reaction performed at 40° C. for 1 hour. After the end of the polymerization reaction, an excess of vinylethylether was added to stop the polymerization, then the obtained solution was poured into a large excess of isopropanol, whereupon the polymer precipitated. The precipitated polymer was recovered, washed by isopropanol, then dried in vacua at 40° C. for 3 days to thereby obtain 98 parts of the cyclopentene ring-opening polymer (A2) having chlorine atom at the end of the polymer chain. The weight average molecular weight (Mw) of the obtained cyclopentene ring-opening polymer (A2)

was 438,000, the molecular weight distribution (Mw/Mn) was 1.99, and the cis/trans ratio was 17/83. Further, the ratio of introduction of a halogen atom to the polymer chain end was 100%.

Example 1

In a nitrogen atmosphere, a pressure resistant glass reaction vessel equipped with a stirrer was charged with 50 parts of the cyclopentene ring-opening polymer (A1) having a bromine atom at a polymer chain end obtained in Production Example 1 and 450 parts of tetrahydrofuran (THF). The cyclopentene ring-opening polymer (A1) was dissolved in THF, then further 1.1 parts of 3-aminopropyltriethoxysilane and 0.51 part of triethylamine were added and the mixture stirred at 60° C. for 48 hours to thereby cause the bromine atom at a polymer chain end and the amino group of the 3-aminopropyltriethoxysilane to react. After the end of the reaction, the solution in the vessel was poured into a large excess of isopropanol containing 2,6-di-t-butyl-p-cresol (BHT), whereupon the polymer precipitated. The precipitated polymer was recovered, washed by isopropanol, then vacuum dried at 40° C. for 3 days to thereby obtain 50 parts of a cyclopentene ring-opening polymer (A1-Si) having a specific end structure. The weight average molecular weight (Mw) of the obtained cyclopentene ring-opening polymer (A1-Si) was 334,000, while the molecular weight distribution (Mw/Mn) was 2.45. Further, the ratio of introduction of specific end structure to the polymer chain ends was 75%. Part of the obtained cyclopentene ring-opening polymer (A1-Si) was used to evaluate the affinity with a filler.

Further, 50 parts of the obtained cyclopentene ring-opening polymer (A1-Si), 55 parts of a commercially available styrene-butadiene rubber (product name "Nipol SBR1723", amount of bonded styrene 23.5%, extension oil content 27.3%, made by Zeon Corporation), and 10 parts of a commercially available polybutadiene rubber (product name "Nipol BR1220", made by Zeon Corporation) were masticated in a Brabender type mixer for 30 seconds, then 50 parts of silica (product name "Zeosil 1165MP", made by Rhodia), 5.6 parts of a silane coupling agent (product name "Si75", bis(3-(triethoxysilyl)propyl)disulfide, made by Degussa), and 15 parts of process oil (product name "Fukkol Elamic 30, made by Nippon Oil Corporation) were added and kneaded at 80° C. as the starting temperature for 1.5 minutes, then further 10 parts of silica (product name "Zeosil 1165MP", made by Rhodia), 30 parts of carbon black (product name "Seast 7HM", made by Tokai Carbon), 20 parts of process oil (Fukkol Elamic 30, made by Nippon Oil Corporation), 3 parts of zinc oxide, 2 parts of stearic acid, 2 parts of antioxidant (product name "Nocrac 6C", made by Ouchi Shinko Chemical Industrial), and 1 part of paraffin wax were added and further kneaded for 2.5 minutes then the kneaded material was discharged from the mixer. The temperature of the kneaded material at the time of the end of kneading was 150° C. The kneaded material was cooled down to room temperature, then was again kneaded in a Brabender type mixer at 80° C. as the starting temperature for 2 minutes, then the kneaded material was discharged from the mixer. Next, an open roll was used at 50° C. to knead the obtained kneaded material with 1.7 parts of sulfur and 3.1 parts of a cross-linking accelerator (mixture of 1.6 parts of N-cyclohexyl-2-benzothiazylsulfenamide and 1.5 parts of diphenylguanidine), then the sheet shaped polymer composition was taken out. This polymer composition was evaluated for low heat buildup property. The results of these measurements and evaluation in Example 1 are shown together in Table 1.

TABLE 1

Table 1

| | Reaction for introducing specific end structure | | Cyclopentene ring-opening polymer after introduction of specific end structure | | | Polymer composition | |
|---|---|---|---|---|---|---|---|
| | Cyclopentene ring-opening polymer having halogen atom at polymer chain end | Compound containing alkoxysilyl group and aminogroup in its molecule | Weigh average molecular weight (Mw) | Molecular weight distribution (Mw/Mn) | Rate of introduction of specific end structure (%) | Affinity with filler (amount of increase (g)/ silica + carbon black (g)) | Low heat buildup property (index) |
| Example 1 | A1 (end Br) | 3-aminopropyl triethoxysilane | 334,000 | 2.45 | 75 | 0.44 | 81 |
| Example 2 | A1 (end Br) | 3-aminopropyl triethoxysilane | — | — | — | 0.55 | 78 |
| Example 3 | A2 (end Cl) | N-(2-aminoethyl)-3-aminopropyl-trimethoxysilane | 378,000 | 2.20 | 88 | 0.40 | 84 |
| Comparative Example 1 | A1 (end Br) | none | 380,000 | 1.92 | 0 (Br = 74%) | 0.12 | 99 |
| Comparative Example 2 | A2 (end Cl) | none | 438,000 | 1.99 | 0 (Cl = 100%) | 0.11 | 100 |
| Comparative Example 3 | A'1 (end Si(OEt)$_3$) | none | 338,000 | 2.05 | 0 (Si(OEt)$_3$ = 100%) | 0.33 | 92 |
| Comparative Example 4 | no functional group | none | 291,100 | 2.15 | 0 | 0.10 | 100 |
| Comparative Example 5 | B1 (end OH) | 3-(triethoxysilyl) propylisocyanate* | 283,600 | 1.90 | 0 (urethane Si(OEt)$_3$ = 94%) | 0.21 | 94 |

*Compound containing alkoxysilyl group and isocyanate group in its molecule

Example 2

50 parts of the cyclopentene ring-opening polymer (A1) obtained at Production Example 1, 55 parts of a commercially available styrene-butadiene rubber (product name "Nipol SBR1723", amount of bonded styrene 23.5%, extension oil content 27.3%, made by Zeon Corporation), 10 parts of a commercially available polybutadiene rubber (product name "Nipol BR1220", made by Zeon Corporation), and 1.1 part of 3-aminopropyltriethoxysilane were masticated in a Brabender type mixer for 30 seconds to obtain a kneaded material.

Further, except for using the entire amount of the kneaded material obtained by the above for the production of a sheet shaped polymer composition like in Example 1 (processes starting from process for masticating styrene-butadiene rubber and polybutadiene rubber), the same procedure was followed as in Example 1 to prepare a sheet shaped polymer composition. This polymer composition was evaluated for low heat buildup property. The results of the measurements and evaluations in Example 2 are shown together in Table 1. Further, as the affinity with a filler, it was performed by dissolving 1 part of the cyclopentene ring-opening polymer (A1) obtained in Production Example 1 in 18 parts of decalin, then adding 0.5 part of silica (product name "Zeosil 1165MP", made by Rhodia) and 0.5 part of carbon black (product name "Seast 7HM", made by Tokai Carbon) to this solution and further adding 0.022 part of 3-aminopropyltriethoxysilane, then stirring at 150° C. for 6 hours. After that, the same procedure was followed as in the section on "Evaluation of Affinity of Cyclopentene Ring-Opening Polymer With Filler" to find the weight increased from the total 1 part of the silica and carbon black used.

Example 3

Except for using 50 parts of the cyclopentene ring-opening polymer (A2) obtained in Production Example 2 instead of 50 parts of the cyclopentene ring-opening polymer (A1) obtained in Production Example 1 and except for using 1.3 parts of N-(2-aminoethyl)-3-aminopropyltrimethoxysilane instead of 1.1 parts of 3-aminopropyltriethoxysilane, the same procedure was followed as in Example 1 to obtain 50 parts of the cyclopentene ring-opening polymer (A2-Si) having the specific end structure. The weight average molecular weight (Mw) of the obtained cyclopentene ring-opening polymer (A2-Si) was 378,000, while the molecular weight distribution (Mw/Mn) was 2.20. Further, the ratio of introduction of the specific end structure to a polymer chain end was 88%. Part of the obtained cyclopentene ring-opening polymer (A2-Si) was used to evaluate the affinity with a filler. Next, except for using 50 parts of the obtained cyclopentene ring-opening polymer (A2-Si) instead of 50 parts of the cyclopentene ring-opening polymer (A1-Si), the same procedure was followed as in Example 1 to prepare a sheet shaped polymer composition. This polymer composition was evaluated for low heat buildup property. The results of the measurements and evaluations in Example 3 are shown together in Table 1.

Comparative Example 1

Part of the cyclopentene ring-opening polymer (A1) having a bromine atom at a polymer chain end obtained in Production Example 1 was evaluated for affinity with a filler. Further, the cyclopentene ring-opening polymer (A1) obtained in Production Example 1 was used and the same procedure was followed as in Example 2 to prepare a sheet shaped polymer composition except for not adding 1.1 parts of 3-aminopropyltriethoxysilane. This polymer composition was evaluated for low heat buildup property. The results of the measurements and evaluations in Comparative Example 1 are shown together in Table 1.

Comparative Example 2

Part of the cyclopentene ring-opening polymer (A2) having a chlorine atom at a polymer chain end obtained in Production Example 2 was evaluated for affinity with a filler. Further, the cyclopentene ring-opening polymer (A2) obtained in Production Example 2 was used and the same procedure was followed as in Example 2 to prepare a sheet shaped polymer composition except for not adding 1.1 parts of 3-aminopropyltriethoxysilane. This polymer composition was evaluated for low heat buildup property. The results of the measurements and evaluations in Comparative Example 2 are shown together in Table 1.

Comparative Example 3

In a nitrogen atmosphere, a pressure resistant glass reaction vessel equipped with a stirrer was charged with 8.7 parts of a concentration 1.0 wt % $WCl_6$/toluene solution and 4.3 parts of a concentration 2.5 wt % diisobutylaluminum mono (n-hexyloxide)/toluene solution. These were stirred for 15 minutes to thereby obtain a catalyst solution. Further, in a nitrogen atmosphere, a pressure resistant glass reaction vessel equipped with a stirrer was charged with 150 parts of cyclopentene and 0.21 part of bis(triethoxysilyl)ethylene. To this, 13 parts of the thus prepared catalyst solution was added and a polymerization reaction was performed at 25° C. for 6 hours. After the polymerization reaction, an excess of isopropanol was added to stop the polymerization. The obtained solution was poured in a large excess of isopropanol, whereupon the polymer precipitated. The precipitated polymer was recovered, washed by isopropanol, then dried in vacuo at 40° C. for 3 days to thereby obtain 76 parts of the cyclopentene ring-opening polymer (A'1) having triethoxysilyl group introduced by a metathesis reaction at the end of the polymer chain. The weight average molecular weight (Mw) of the obtained polymer was 338,000, the molecular weight distribution (Mw/Mn) was 2.05, and the cis/trans ratio was 60/40. Further, the ratio of introduction of a triethoxysilyl group to a polymer chain end was 100%. Part of the obtained polymer was evaluated for affinity with a filler. Furthermore, except for using 50 parts of the obtained cyclopentene ring-opening polymer (A'1) instead of 50 parts of the cyclopentene ring-opening polymer (A1-Si), the same procedure was followed as in Example 1 to prepare a sheet shaped polymer composition. This polymer composition was evaluated for low heat buildup property. The results of the measurements and evaluations in Comparative Example 3 are shown together in Table 1.

Comparative Example 4

Except for using 0.090 part of 1-hexene instead of 0.21 part of bis(triethoxysilyl)ethylene, the same procedure was followed as in Comparative Example 3 to obtain 68 parts of a cyclopentene ring-opening polymer not having a functional group at a polymer chain end. The weight average molecular weight (Mw) of the obtained cyclopentene ring-opening polymer was 291,100, the molecular weight distribution (Mw/Mn) was 2.15, and the cis/trans ratio was 61/39.

Part of the obtained cyclopentene ring-opening polymer was evaluated for affinity with a filler. Furthermore, except for using 50 parts of the obtained cyclopentene ring-opening polymer instead of 50 parts of the cyclopentene ring-opening polymer (A1-Si), the same procedure was followed as in Example 1 to prepare a sheet shaped polymer composition. This polymer composition was evaluated for low heat buildup property. The results of the measurements and evaluations in Comparative Example 4 are shown together in Table 1.

Comparative Example 5

Except for using 0.038 part of 2-butene-1,4-diol instead of 0.24 part of 1,4-dichloro-2-butene, the same procedure was followed as in Production Example 2 to perform polymerization and obtain 130 parts of the cyclopentene ring-opening polymer (B1) having a hydroxyl group at a polymer chain end. The weight average molecular weight (Mw) of the obtained cyclopentene ring-opening polymer (B1) was 283,600, the molecular weight distribution (Mw/Mn) was 1.90, and the cis/trans ratio was 18/82. Further, the ratio of introduction of a hydroxyl group to the polymer chain end was 91%. Next, in a nitrogen atmosphere, a pressure resistant glass reaction vessel equipped with a stirrer was charged with 70 parts of a cyclopentene ring-opening polymer (B1) having a hydroxyl group at a polymer chain end and 630 parts of toluene, and the polymer was dissolved in the toluene. Further, 18 parts of 3-(triethoxysilyl)propylisocyanate was added and the result stirred at 100° C. for 20 hours to thereby cause the hydroxyl groups at the polymer chain end and the isocyanate group of 3-(triethoxysilyl)propylisocyanate to react to form a urethane bound group. After the end of the reaction, the solution inside the vessel was poured into a large excess of isopropanol containing 2,6-di-t-butyl-p-cresol (BHT), whereupon the polymer precipitated. The precipitated polymer was recovered, washed with isopropanol, then dried in vacuo at 40° C. for 3 days to thereby obtain 70 parts of a cyclopentene ring-opening polymer (B1-Si) having triethoxysilyl group through urethane bond. The weight average molecular weight (Mw) of the obtained cyclopentene ring-opening polymer (B1-Si) was 351,600, while the molecular weight distribution (Mw/Mn) was 1.95. Further, the ratio of introduction of a triethoxysilyl group to the polymer chain end through a urethane bond was 94%. Part of the obtained cyclopentene ring-opening polymer was used to evaluate the affinity with a filler. Further, except for using 50 parts of the obtained cyclopentene ring-opening polymer (B1-Si) instead of 50 parts of the cyclopentene ring-opening polymer (A1-Si), the same procedure was followed as in Example 1 to prepare a sheet shaped polymer composition. This polymer composition was evaluated for low heat buildup property. The results of the measurements and evaluations in Comparative Example 5 are shown together in Table 1.

Summary of Examples and Comparative Examples

The cyclopentene ring-opening polymer having, at their polymer chain end, a structure where a polymer chain and a group containing an alkoxysilyl group are bonded through —NH— and represented by the general formula (1) was high in affinity of the cyclopentene ring-opening polymer with a filler and good in low heat buildup property (Examples 1 to 3). As opposed to this, when there was no structure like in the Examples, the affinity of the cyclopentene ring-opening polymer with a filler became low and the low heat buildup property was poor (Comparative Examples 1 to 5).

The invention claimed is:

1. A cyclopentene ring-opening polymer having, at a polymer chain end, a structure where a polymer chain and a group containing an alkoxysilyl group are bonded through —NH— and having a weight average molecular weight of 100,000 to 1,000,000, wherein
the structure is a structure represented by the following general formula (1):

$$\text{pCP}—Y^1—NH—Y^2—Si(OR^1)_a(R^2)_{3-a} \quad (1)$$

where, in the general formula (1), pCP represents a cyclopentene ring-opening polymer chain, $Y^1$ represents a bivalent hydrocarbon group having 1 to 20 carbon atoms, each of $R^1$ and $R^2$ represents a hydrocarbon group having 1 to 20 carbon atoms, $Y^2$ represents a bivalent hydrocarbon group having 1 to 20 carbon atoms in which —NH— may be interposed, and "a" is an integer of 1 to 3.

2. The cyclopentene ring-opening polymer according to claim 1, wherein the group containing an alkoxysilyl group is a group containing a trialkoxysilyl group.

3. The cyclopentene ring-opening polymer according to claim 1, wherein each of $R^1$ and $R^2$ represents a hydrocarbon group having 1 to 10 carbon atoms.

4. The cyclopentene ring-opening polymer according to claim 1, wherein each of $R^1$ and $R^2$ represents a methyl group or an ethyl group.

5. The cyclopentene ring-opening polymer according to claim 1, wherein $Y^2$ represents a bivalent hydrocarbon group having 1 to 10 carbon atoms in which —NH— may be interposed.

6. The cyclopentene ring-opening polymer according to claim 1, wherein $Y^1$ represents a bivalent hydrocarbon group having 1 to 10 carbon atoms.

7. The cyclopentene ring-opening polymer according to claim 1, which has a weight average molecular weight of 150,000 to 900,000.

8. The cyclopentene ring-opening polymer according to claim 1, which has a weight average molecular weight of 200,000 to 800,000.

9. A method of production of a cyclopentene ring-opening polymer according to claim 1, comprising
producing a cyclopentene ring-opening polymer having a halogen atom at a polymer chain end, and
then causing the halogen atom of the cyclopentene ring-opening polymer having a halogen atom at a polymer chain end to react with the amino group of a compound containing an alkoxysilyl group and amino group in its molecule.

10. A method of production of a cyclopentene ring-opening polymer according to claim 2, comprising
producing a cyclopentene ring-opening polymer having a halogen atom at a polymer chain end, and
then causing the halogen atom of the cyclopentene ring-opening polymer having a halogen atom at a polymer chain end to react with the amino group of a compound containing an alkoxysilyl group and amino group in its molecule.

11. A polymer composition comprising a polymer component containing the cyclopentene ring-opening polymer according to claim 1 into which 10 to 150 parts by weight of silica or 10 to 150 parts by weight of silica and carbon black in total are mixed with respect to 100 parts by weight of the polymer component.

12. The polymer composition according to claim 11, further comprising a cross-linking agent.

13. A polymer composition comprising a polymer component containing the cyclopentene ring-opening polymer according to claim 2 into which 10 to 150 parts by weight of silica or 10 to 150 parts by weight of silica and carbon black in total are mixed with respect to 100 parts by weight of the polymer component.

14. A polymer composition comprising a cyclopentene ring-opening polymer having, at a polymer chain, a structure where a polymer chain end and a group containing an alkoxysilyl group are bonded through —NH—, the cyclopentene ring-opening polymer being obtained by mixing and reacting, with respect to 100 parts by weight of a polymer component including a cyclopentene ring-opening polymer having a halogen atom at a polymer chain end, 10 to 150 parts by weight of silica or 10 to 150 parts by weight of silica and carbon black in total and 0.01 to 20 parts by weight of a compound containing an alkoxysilyl group and amino group in its molecule, wherein the structure is a structure represented by the following general formula (1):

$$pCP—Y^1—NH—Y^2—Si(OR^1)_a(R^2)_{3-a} \quad (1)$$

where, in the general formula (1), pCP represents a cyclopentene ring-opening polymer chain, $Y^1$ represents a bivalent hydrocarbon group having 1 to 20 carbon atoms, each of $R^1$ and $R^2$ represents a hydrocarbon group having 1 to 20 carbon atoms, $Y^2$ represents a bivalent hydrocarbon group having 1 to 20 carbon atoms in which —NH— may be interposed, and "a" is an integer of 1 to 3.

15. The polymer composition according to claim 14, further comprising a cross-linking agent.

16. A cross-linked polymer obtained by cross-linking the polymer composition according to claim 12.

17. A cross-linked polymer obtained by cross-linking the polymer composition according to claim 15.

* * * * *